W. G. WRIGHT.
DYNAMO ELECTRIC MACHINE.
APPLICATION FILED AUG. 15, 1912.
1,184,805.
Patented May 30, 1916.
2 SHEETS—SHEET 1.
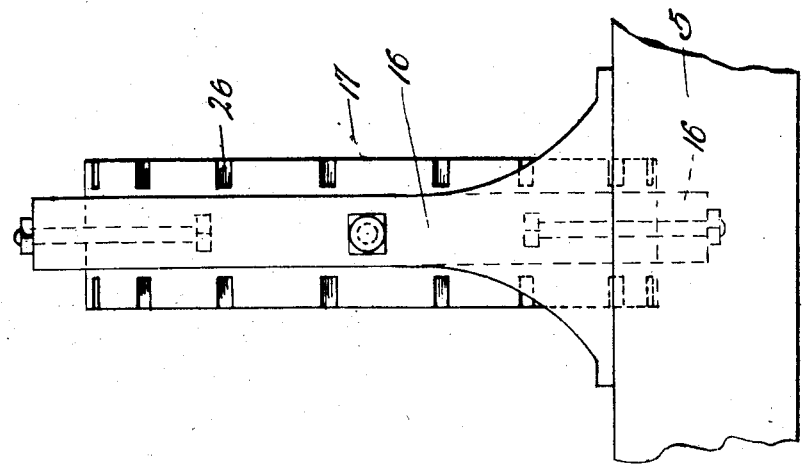
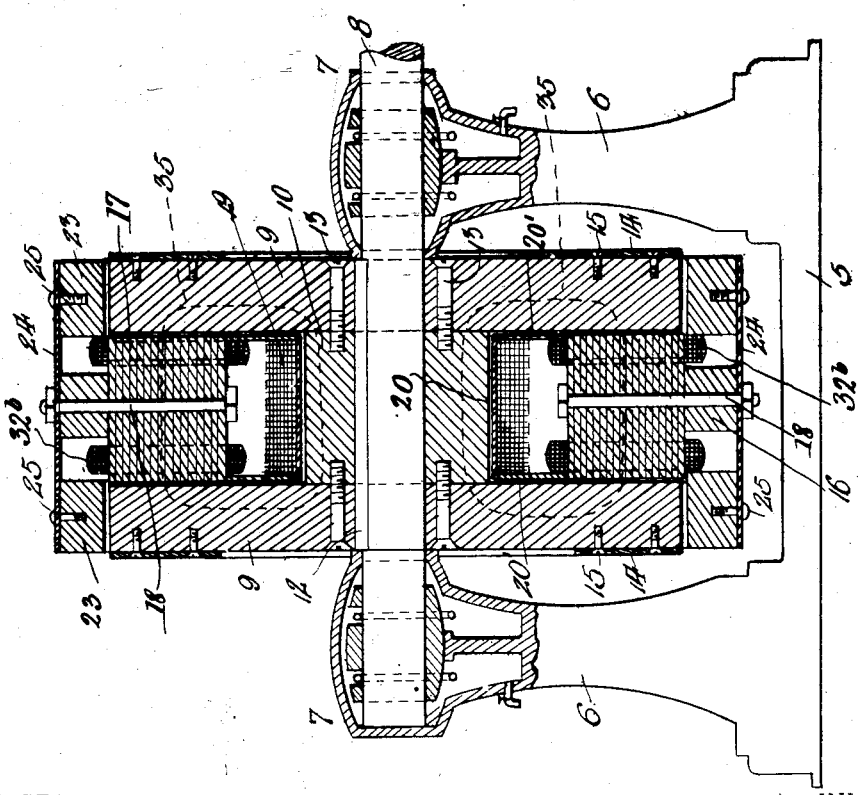
WITNESSES
INVENTOR
William G. Wright,
by Richard Oliver
his Attorney W. G. WRIGHT.
DYNAMO ELECTRIC MACHINE.
APPLICATION FILED AUG. 15, 1912.
1,184,805.
Patented May 30, 1916.
2 SHEETS—SHEET 2.
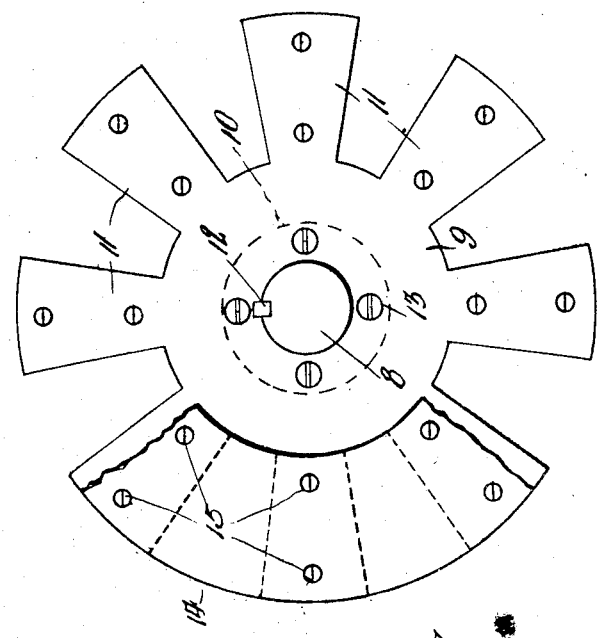
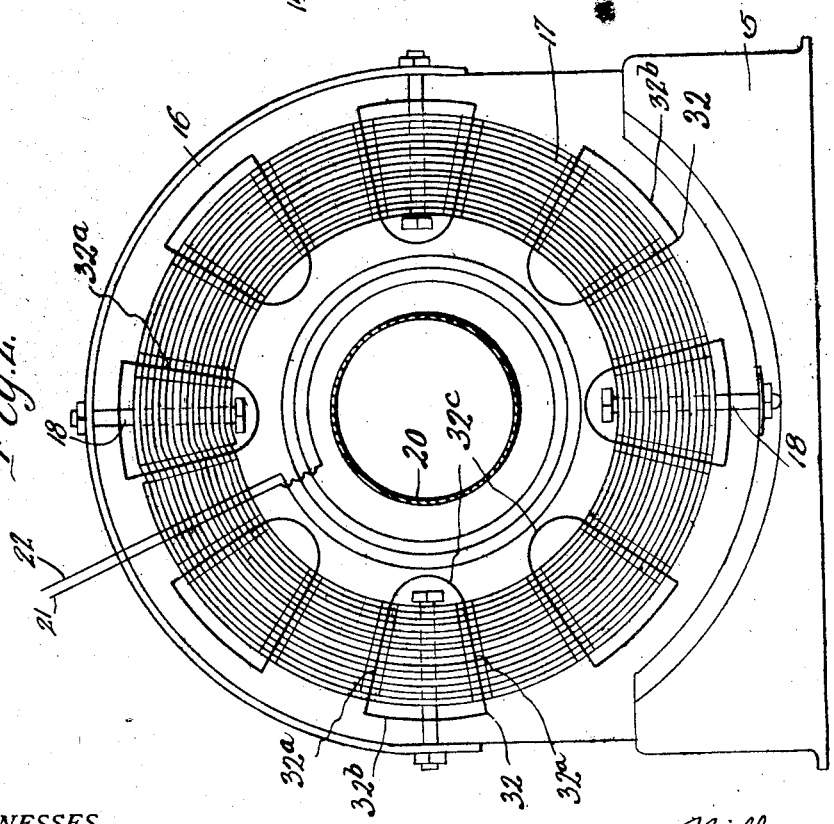
WITNESSES
INVENTOR
William G. Wright,
by Richard ———
his Attorney

UNITED STATES PATENT OFFICE.

WILLIAM G. WRIGHT, OF NEW DULUTH, MINNESOTA.

DYNAMO-ELECTRIC MACHINE.

1,184,805.   Specification of Letters Patent.   Patented May 30, 1916.

Application filed August 15, 1912. Serial No. 715,272.

*To all whom it may concern:*

Be it known that I, WILLIAM G. WRIGHT, a citizen of the United States, residing at New Duluth, county of St. Louis, and State of Minnesota, have invented new and useful Improvements in Dynamo-Electric Machines, of which the following is a specification.

My present invention relates to dynamo electric machines having a stationary armature and a revolving field.

The principal objects of my invention are to provide a machine of the character described, reducing the number of bearings to a minimum and avoiding moving conductors and sliding contacts, such as commutators and collector rings; to provide a machine of the character described which may be used for generating an alternating current to so dispose elements of the machine to particularly adapt it to meet the requirements of high speed machinery, and, in general, to provide a machine which is simple in construction, efficient in action, and susceptible of easy repair.

Other objects of my invention will appear in the following detailed description, in connection with the accompanying drawing forming a part of this specification, and in which drawing:

Figure 1 is a central vertical transverse sectional view through a machine embodying my invention. Fig. 2 is a front elevation of the machine, the elements appertaining to the field having been removed to disclose the details of construction, and the field and alternating current coil conductors being diagrammatically represented. Fig. 3 is an elevation of the stationary armature core and its support. Fig. 4 is a face view of one of the field disks.

Similar characters refer to similar parts throughout the views.

Suitable frame-work, which may include a bed-plate 5 and standards 6, surmounted thereon carry bearings 7 having axially alined bores. Consistent with an object of my invention, that is, to permit of high speed of the rotating parts of the machine, these bearings are preferably of the self-adjusting and self-lubricant feed type.

Bearings 7 support a rotatable shaft 8 carrying two field disks 9 held in spaced apart relation to each other by a field core 10. The disks 9 and core 10 may be secured to shaft 8, to rotate therewith, as by a key 12 entering complementary grooves in these four elements. I find it desirable to rigidly connect the disks with the core 10 as by bolts 13, although it is evident that the disks and core may be cast integral, without departing from the spirit of my invention, the construction as shown being to facilitate assemblage of the machine.

Each field disk 9 is provided with a plurality of radially extending poles 11 which, in the assembled machine complement each other to aid in providing a magnetic circuit for the field flux. Exteriorly to each disk 9, in order to protect the poles 11, I provide an annulus 14 of non-magnetic material, secured by screws 15, or any other suitable means may be provided to close the space between the poles.

The armature is disposed intermediate the disks 9 and is stationarily mounted. To accomplish this, an annular frame 16, clearly shown in Fig. 3 of the drawing, is rigidly mounted upon the bed-plate 5 and has bolted to its internal periphery an annular core 17, preferably built up of laminated band iron and relatively wider than the said annular frame. Bolts 18 rigidly secure the armature core to frame 16, as clearly shown in Figs. 1 and 2 of the drawing. The frame 16, through the intermediacy of armature core 17 rigidly supports a field exciting coil 19 wound about a spool 20 to partially fill it and encircling the field core 10. It is to be noted that said spool 20 does not contact in any manner with the elements 9 or 10 and includes flanges 20' which engage the internal periphery of armature core 17. The conductors of coil 19 are designated by characters 21 and 22, as clearly shown in Fig. 2 of the drawing.

The ends of the poles 11 of each disk 9 are protected by an annulus 23 one for each disk, supported, in a stationary manner, by the frame 16, through plates 24 and screws 25.

Each face of the armature core is provided with radial grooves 26 to accommodate conductors as hereinafter described.

The grooves 26 in the armature core accommodate radially extending portions 32$^a$ of alternating current coil conductors 32 while the other portions 32$^b$ and 32$^c$ of said conductors are disposed laterally of the frame 16 and intermediate the flanges 20', respectively, as clearly shown in Fig. 1 of the drawings. Of coils 32 on each face of the armature core there are a number equal to the number of poles on each field disk, or this may be alternated, as hereinafter noted. The conductors 32 are connected in series and alternating current conductors 33 and 34 lead from these conductors 32. I may connect the coils on the one face of the armature core with those on the other face in series or multiple, to act in unison, or I may provide separate conductors, whereby separate currents are generated.

It is obvious that the machine may be constructed as disclosed in the drawings, as a single phase alternator, as a two phase alternator or as a three phase alternator.

It will be readily understood that various modifications of the construction may be made, such as winding the machine with delta or Y connections well known to those skilled in the art and attention is also directed to the fact that the field core and poles may be of laminated material so as to reduce current consumption owing to the generation of eddy currents in the magnetic circuit.

I claim:—

1. In a dynamo electric machine, the combination of two sets of field poles rotatable about a common axis, a field core separating said sets of field poles, a spool about said core but not contacting therewith, said spool including flanges in close proximity to and having their planes in parallelism to the planes of said sets of field poles, a field exciting coil about said spool but not filling the same, an annular armature core intermediate said sets of poles and into which the said spool fits with the said flanges of the latter engaging the internal periphery of said annular core, said core having radial grooves open to the space intermediate the said flanges, means for rigidly mounting said armature core, an alternating current coil conductor accommodated by the said grooves of said armature core and continuing exteriorly of said field coil and within the said flanges of the said spool.

2. In a dynamo electric machine, the combination of a stationary frame having a circular opening, an annular armature core relatively wider than said frame and disposed within said opening thereof and in contact with the internal periphery, said core having radial grooves, alternating current coil conductors having portions accommodated within said grooves and portions exteriorly and interiorly of the core, the portions exteriorly thereof lying laterally of said frame, rotatable field poles at each side of said armature core, and means carried by said frame for inclosing those portions of said alternating current coil conductors exteriorly of said armature core and protecting the ends of said poles, substantially as and for the purpose set forth.

WILLIAM G. WRIGHT.

Witnesses:
M. E. JONES, Jr.,
RICHARD B. OWEN.